Figure 1:
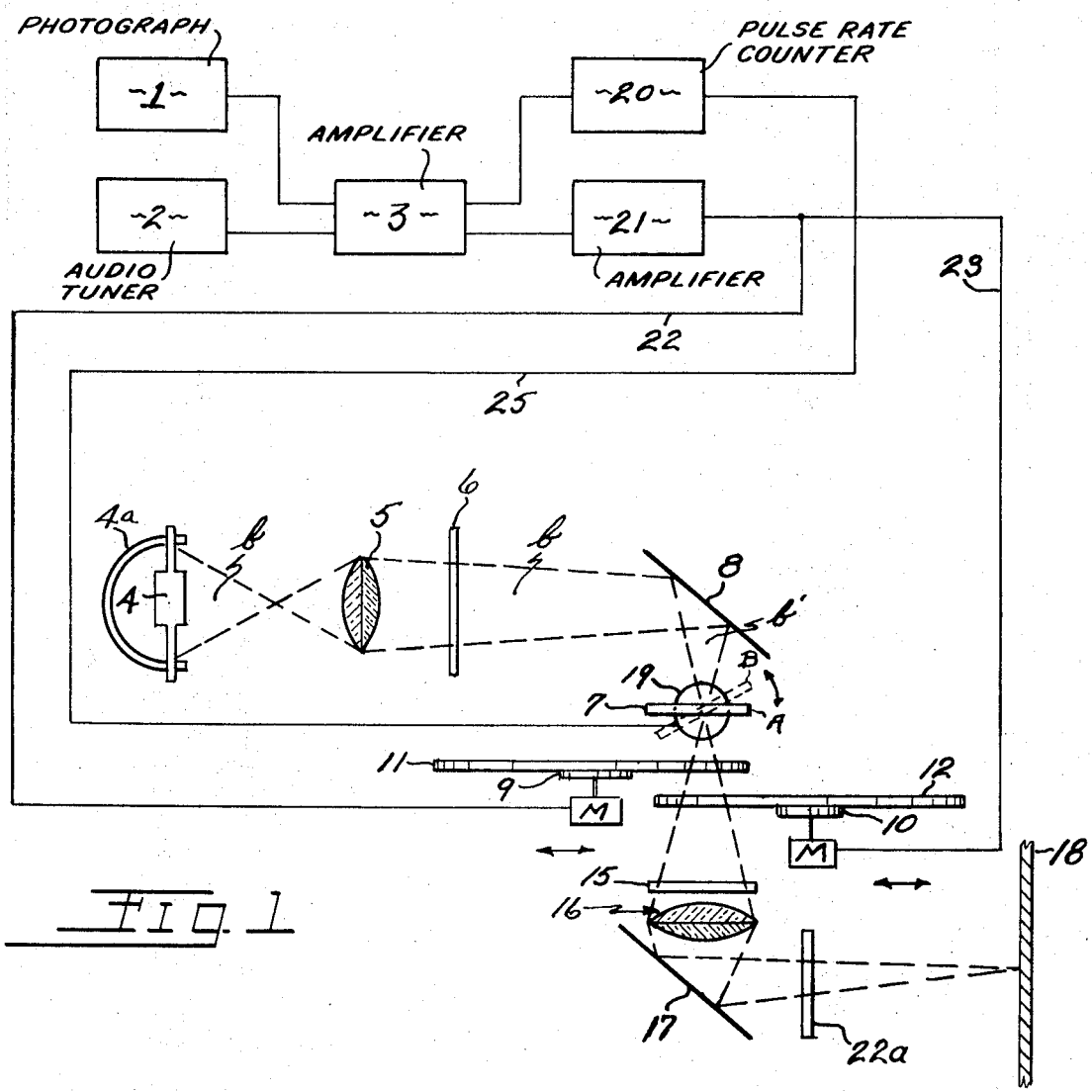

United States Patent

[11] 3,563,130

[72] Inventor Stanley B. Elliott
7125 Conelly Blvd., Walton Hills, Ohio 44146
[21] Appl. No. 778,508
[22] Filed Nov. 25, 1968
[45] Patented Feb. 16, 1971

[54] VISUAL INTERPRETATION APPARATUS
10 Claims, 7 Drawing Figs.
[52] U.S. Cl. .................................................. 84/464
[51] Int. Cl. ................................................. A63j 17/00
[50] Field of Search ........................................ 84/464; 350/158; 353/15

[56] References Cited
UNITED STATES PATENTS
3,163,078  12/1964  Elliott .......................... 84/464
3,218,926  11/1965  Boone .......................... 350/158X Primary Examiner—Richard B. Wilkinson
Assistant Examiner—John F. Gonzales
Attorney—Baldwin, Egan, Walling & Fetzer ABSTRACT: Visual interpretation apparatus for interpreting electric current signals generated by electronic intelligence devices such as audio sound systems creating music, and the like by means of record players, phonographs, radios, AM and FM tuners, transmitters, receivers and the like and which apparatus has a light optical system for receiving and projecting a light beam(s) onto a viewing surface. A plurality of light polarization and light retardation devices are disposed in the path of the beam and are variably movably responsive to the electric current signals to interpret said intelligence and provide visual light patterns on the viewing surface which correspond to said electric current signals. The polarization and retardation devices may partake of various configurations such as discs, vanes and the like. The variable movement of said devices is in the path of the light beam and is in response to the variation in the electric current signals. A consequent change or "sweep" of color on the viewing surface may also be accompanied by what appears to be movement of the imagery within the confines of the image projected onto the viewing surface.

INVENTOR
STANLEY B. ELLIOTT
Baldwin, Egan, Walling & Fetzer
ATTORNEYS

INVENTOR
STANLEY B. ELLIOTT
Baldwin, Egan, Walling & Fetzer
ATTORNEYS

VISUAL INTERPRETATION APPARATUS

This invention relates to an improved device for the visual interpretation of electric current signals, and more particularly it relates to visual interpretation apparatus incorporating light polarizing and light retarding means responsive to the characteristics of electrical current signals applied thereto and which apparatus interprets said characteristics and provides visual light patterns corresponding to said signals, said patterns offering hitherto unequaled esthetic complementation.

Heretofore, may types of color organs, as they are often referred to in the art, have been offered. Most are characterized by visual displays of such a random nature that the eye cannot effectively correlate them with the audio sounds concurrently representing such patterns. Another problem with most organs is the relatively fixed nature of the visual display, the great variance in tonal patterns which characterize music being represented by a fixed diffusing screen changing only in color. Or if pattern variation is sought, in order to more closely stimulate a new type of music, the pattern changes are slow and laborious. Thus, standard color organs heretofore in use have failed to secure the fusion of sound and vision in the mind of the viewer which is essential for a truly esthetic experience.

In my previously issued U.S. Pat. No. 3,163,078 I have described a system which has come much closer than any previous apparatus in terms of offering rich imagery, readily changeable, which can be selected to match the mood or type of music and which offers interesting and generally satisfying visual complementation to the music. However, I have found that in order to better accompany the complex structure of music, a still closer complementation is desirable.

I have now found that a much superior complementation of music and imagery is secured when a device is used which causes apparent movement within the confines of the image or background illumination that is projected onto the screen. By this is meant a dynamic movement of changing color (or light intensity if a suitable color neutralizing filter is used in the optical system) across the face of the screen. This "sweep" of color emphasizes the change in music and creates an esthetic effect which is entirely different from and much more satisfying than the gradual overall change in screen color or intensity which characterized the device covered in U.S. Pat. No. 3,163,078.

As a further dynamic actuation of the viewing experience the imagery as well can be made to appear to possess movement within the confines of the image projected on the screen through the use of an additional device.

In the present invention there is apparent movement within the color or design element projected onto the screen as well as a "sweep" of background color or illumination whether or not the color or design elements are concurrently flowing across the screen. For the best fusion of music and imagery in the mind of the viewer, the apparent movement within the projected design elements as the "sweep" of background color or illumination representing the electric current signals is proportional to a control signal.

Further, in my U.S. Pat. No. 3,163,078 the background color (the area on the projection screen surrounding the color or design elements) passes from the color to another through the use of birefringent means responsive to a control signal and which is proportionately moved in a plane substantially parallel to that of polarizer and analyzer means. In the present apparatus, I have now devised means by which birefringent means responsive to a control signal changes or sweeps the screen, through a whole series of colors by means of a birefringent vane proportionately responsive to a control signal and which is located in the light path between the polarizer and analyzer, thereby creating a display whose complexity effectively reflects the intrinsic complexity of the music.

Figure 2:
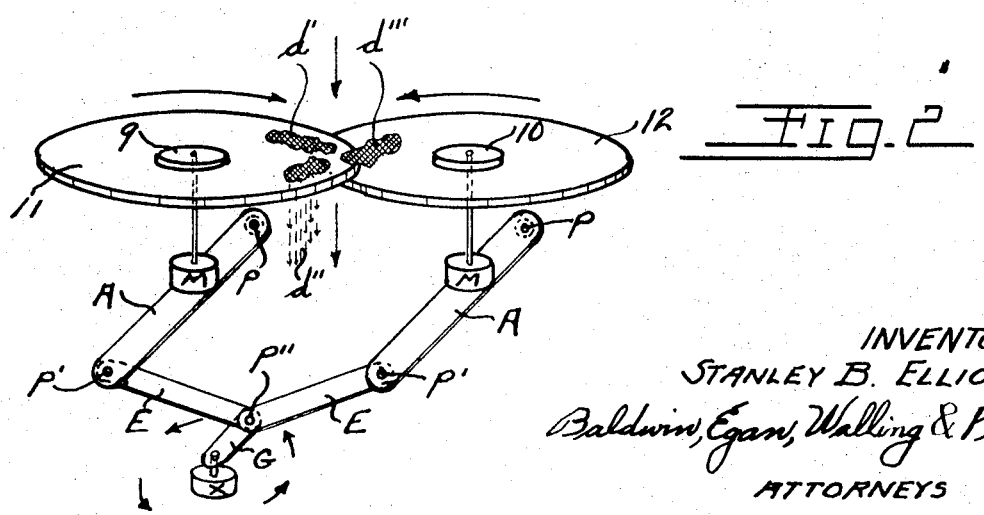

Additional object and advantages of the visual interpretation apparatus of the present invention will be apparent to one skilled in the art to which it pertains and upon reference to the following disclosure of several preferred embodiments thereof, and which are illustrated in the accompanying drawing in which:

FIG. 1 is a view partially shown in schematic form of a transmission type system for providing visual interpretation of electric current signals in accordance with the present invention;

FIG. 2 is a perspective view of the polarizer and analyzer disc-type elements applicable for use in the embodiment shown in FIG. 1 and which elements incorporate several image forming materials therein; and FIGS. 3, 4, 5, 6 and 7 are each respectively an additional embodiment of a visual interpretation apparatus incorporating the inventive concepts of the present invention. Briefly, the visual interpretation apparatus of the present invention incorporates a light polarizing optical system with electronic means for producing electrical signal currents which are representative of an electrically generated phenomenon as for example audio sound, music and the like, and wherein the optical system is actuatable by and responsive to changes in the signal currents so as to instantaneously provide a representative visual color interpretation of the characteristics of said signal currents.

As aforementioned, the visual interpretation system which I have disclosed in my previously issued U.S. Pat. No. 3,163,078 is considered to be the most pertinent development of prior art, to my knowledge, with respect to my present invention. And, as aforesaid I have found that a greatly superior visual color or light display is provided with the present system than has been heretofore possible.

With reference now directed to FIG. 1 in which is illustrated a representative embodiment of the visual interpretation apparatus of the present invention, such apparatus is seen to be applicable for use with an audio sound system for generating audio signals and which in its present form is seen to include a phonograph 1 of conventional configuration shown diagrammatically, the output of which is connected to a conventional amplifier 3 also of conventional design. A conventional audio tuner 2 is also diagrammatically illustrated to represent a second source of electric current signals applicable for use in the present system and has its output similarly connected to the input of the amplifier 3.

The amplified output from amplifier 3 may be passed to a conventional audio amplifier indentified at 21 and also to the input of a conventional pulse rate counter indentified at 20.

The audio signal output of amplifier 21 is taken through conductors 22 and 23 connected in parallel to each other, and applied to the optical system now to be described for actuating the same.

As seen in FIG. 1 the visual interpretation apparatus includes a source of light 4 which may comprise for example a conventional incandescent lamp which, upon energization emits a suitable light beam $b$ and which is projected by reflector 4a to condenser lens 5. Such beam is then passed through polaroid polarizer element 6, the light beam emerging from polarizer 6 projecting onto a reflecting mirror 8 shown angularly disposed thereto so as to provide a reflected beam $b'$ which is then adapted to pass through a vane element, later to be described and which is pivotally or rotatably responsive to a suitable drive unit 19 such as, for example, a *d'Arsonval type of meter drive commonly used in an ammeter for measuring electric current*. The reflected beam $b'$ is seen to pass through transparent discs 11 and 12 which are shown to be disposed one over the other in spaced relation along the vertical path as shown transversed by the reflected light beam $b'$. Each of said discs may be formed of birefringent and nonbirefringent materials and is also seen to be mounted on a suitable turntable 9, 10 respectively, so as to be suitably rotatably actuated thereon by a conventional variable speed DC motor M.

As best seen in FIG. 2, birefringent design elements as depicted at $d'$, $d''$, and $d'''$ may also be located on each of the transparent discs 11 and 12 and in position to intercept the light beam $b'$ passing therethrough.

The light beam emerging from the lowermost disc 12 passes through a polaroid analyzer element as identified at 15 fixedly disposed in the path of said light beam and thence through projection lens system depicted schematically at 16 and onto a reflecting mirror 17, thence through filter element 22a also fixedly disposed in said path and onto the viewing screen or surface as depicted schematically at 18.

The conductors 22 and 23 representing the output of audio amplifier 21 are each shown to be connected respectively to one of the motor devices M in association with turntables 9 and 10 respectively.

The output of counter device 20 is taken by conductor 25 and connected to the current responsive device 19 associated with vane 7.

It is also contemplated that any or all of the signal drive units may be actuatable by either of said amplifier 21 and/or counter 20 so as to be amplitude and/or frequency responsive to said electric current signals, the selection of said signal being primarily one of esthetics.

The operation of this system as described is as follows:

The electric current signal source such as is generated by phonograph 1 or radio tuner 2 has its signal amplified in amplifier 3, and the amplified output therefrom passes to audio amplifier 21 wherein it is further amplified. The amplified output then passes to the DC motors M which as stated are connected in parallel. Each motor M is thus actuated and rotates its associated design disc 11, 12 at a speed corresponding to the magnitude of the electric current signal applied to said motor; said motor speed varying in response to changes in the amplitude of said signal such as for example, a change in the amplitude of music.

As aforementioned, discs 11, 12 carry design elements $d'$, $d''$, etc. which may be composed of both birefringent materials, for example, (nylon, Mylar, cellophane, crystals, etc.) and nonbirefringent materials (dyes, inks, etc.) The imagery on these elements elements is designed to accompany a particular piece of music or a particular type of music, as jazz, electronic, classical, etc.

So that a visual variety is obtained, the disc(s) may also be reciprocated transversely across the light beam. For this purpose, as best seen in FIG. 2, a pair of suspension arms A are each shown to be fixedly pivoted at point P. A motor M is mounted on each of said arms. The opposite end of each arm A is pivoted at P' to one end of link element E. The opposite ends of each link element E is pivoted at P'' to one end of crank G, the latter being connected to the rotatable member of motor X. With this structure, upon rotation of motor X, the crank G provides a swingable reciprocatory movement of suspension arms A about their pivots P whereby to move the discs transversely across the light beam. This movement takes place while the discs are rotated by their respective drive motors M.

Each disc then moves back and forth across the light beam path at the same time that the discs are rotating and tracking the music amplitude. Thus, various segments of the annular design band are scanned at various distances from the disc center at the same time that the discs are scanned by rotation Hence, great visual variety and long period without repetitive imagery are obtained.

Another mode of visual variety results from the two discs 11, 12 which are interposed simultaneously in the light beam, one behind the other. This assembly provides a "foreground" and a "background" image. And, since the design of both discs may be formed of birefringent materials, as foreground and background elements pass through the polarized light beam, the retardance of segments of the light beam is continually changing to form composite, complex, varicolored designs on the viewing surface 18.

As is now apparent, the polarized light beam is formed by passing the light from lamp 4 through condenser lens 5, then through polaroid polarizer 6, onward to mirror 8 and then through the rotating birefrigent design elements on visual discs 11 and 12. The emerging beam then passes through polaroid analyzer 15 and through projection lens 16 to mirror 17 onto viewing screen 18.

The retardance of the polarized light beam is modulated by interposing the vane 7 which is also formed of birefringent materials in the path of the light beam. The angle of the vane and thus the thickness of the birefringent material transversed by the beam is controlled by ammeter drive 19 which drives the vane. The angular position of the vane is controlled by the current output from conventional pulse rate counter 20 connected to said drive by conductor 25. As the average frequency of the electric current signal rises and falls, the number of pulses from counter 20 also correspondingly increases and decreases in a manner well understood. Thus the current to meter 19 may vary and vane 7 deflects correspondingly, for example, from position A to position B. As the angle of deflection of vane 7 increases, the thickness of birefringent material transversed by the light beam increases. Thus, the retardation of the polarized beam increases and the interference color on screen 18 changes. As the frequency of music representing the electric signal increases the screen color may change, for example, from blue (representing the bass register) through red (middle register) and into yellow (treble).

Also, it has been found that by interposing filter 22a in the light beam from mirror 17 and made of the same birefringent material as vane 7, but with its stress lines at right angles to the stress lines of vane 7, the background color may be canceled out. Thus, the colored designs $d'$, $d''$, etc. or discs 11, 12 are displayed against a field which varies from very dark gray to very pale gray.

Figure 3:
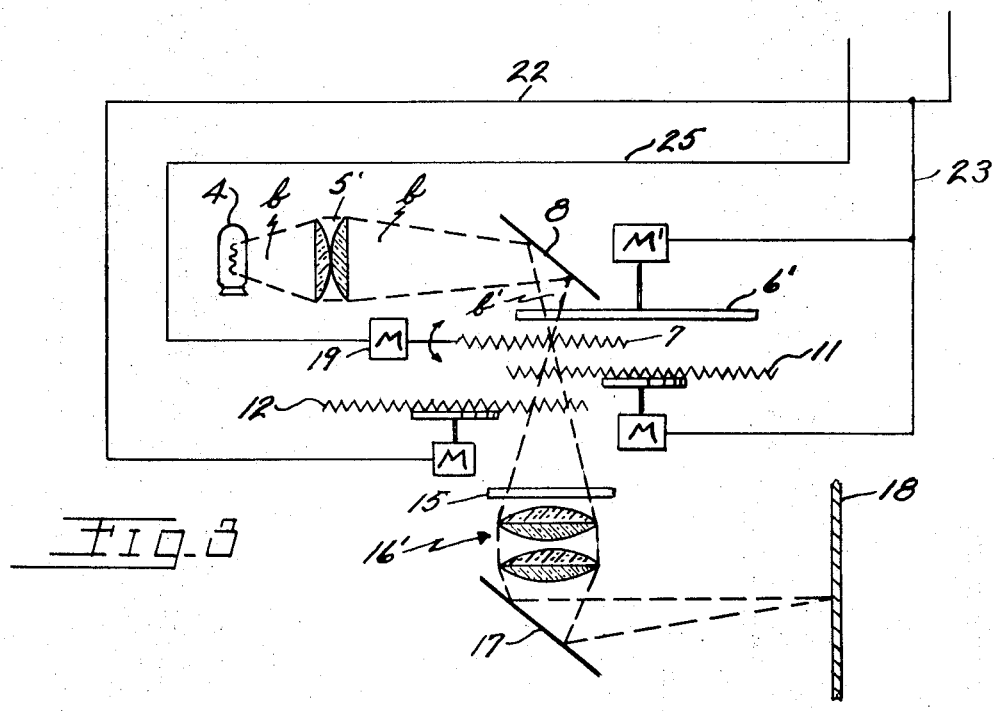

In the embodiment of visual interpretation system as shown in FIG. 3, the polarizer element 6', corresponding to polarizer 6 in the FIG. 1 embodiment is rotatably actuatable by a motor M' as is amplitude responsive to the signal output of amplifier 21. As aforesaid, said motor device M' may also be responsive to counter 20 or like device. Said polarizer may also have portions of its area consisting of designs formed of oriented polarizing material, so as to present the illusion of motion.

Figure 4:
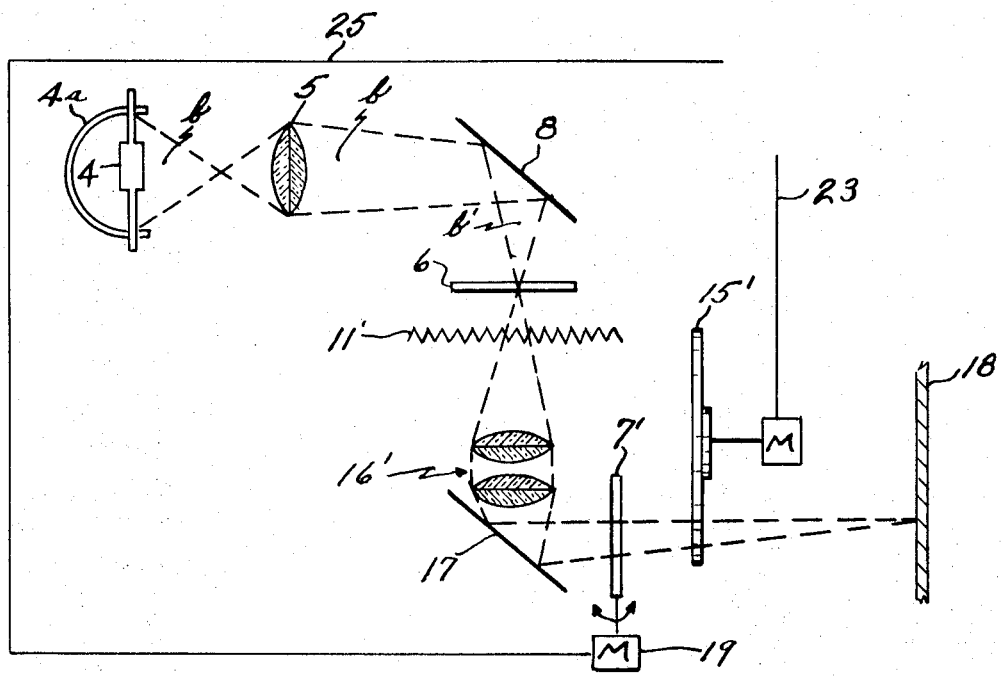

In the embodiment of FIG. 4, the birefringent design element 11' may be used in the same relative position in the structure shown in FIG. 3 but is in a static position therein. The analyzer indentified as 15' is disposed on the output side of the projection lens 16' and may be variably responsive to either signal from amplifier 21 or counter 20.

The birefringent vane 7' corresponding to vane 7 in the previous embodiments is also located on the output side of lens 16' between the latter and the analyzer 15', and may likewise be variably responsive to either signal from counter 20 or amplifier 21.

Polarizer 6 may be formed of conventional polarizing material or it may have a portion of its total area consisting of oriented polarizing material so as to prevent the illusion of motion.

Figure 5:
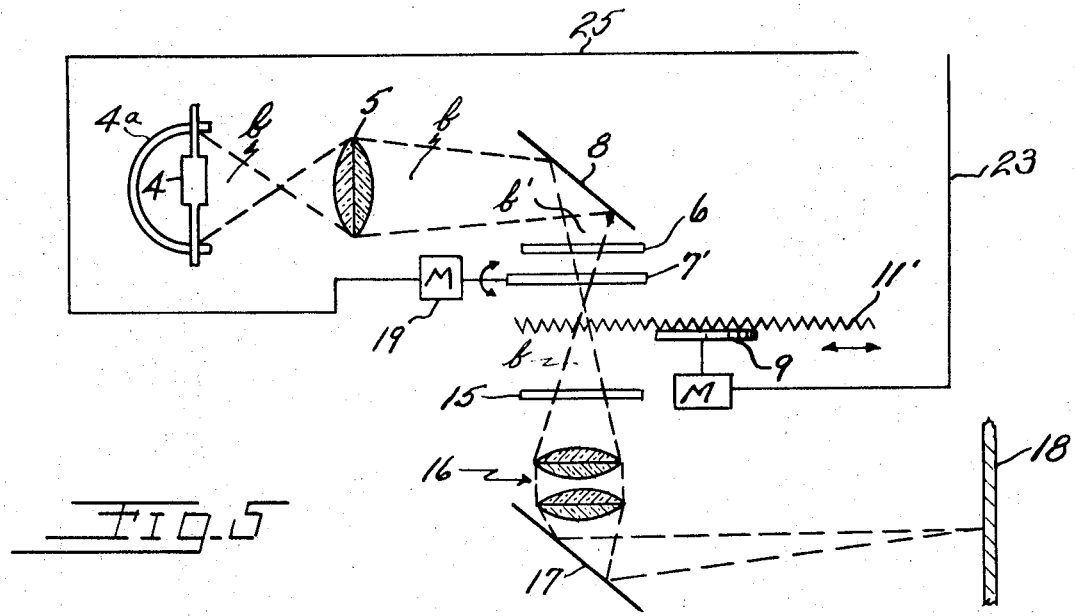

In the structure of FIG. 5 the analyzer and polarizer 6 and 15 corresponding to the same elements in the embodiment of FIG. 1 are both located on the output side of mirror 8 being interposed on opposite sides of vane element 7'. Likewise a single birefringent element 11' is disposed between the vane element 7' and polarizer 15 in the light beam and may be variably responsive to either signal from counter 20 or amplifier 21.

Figure 6:
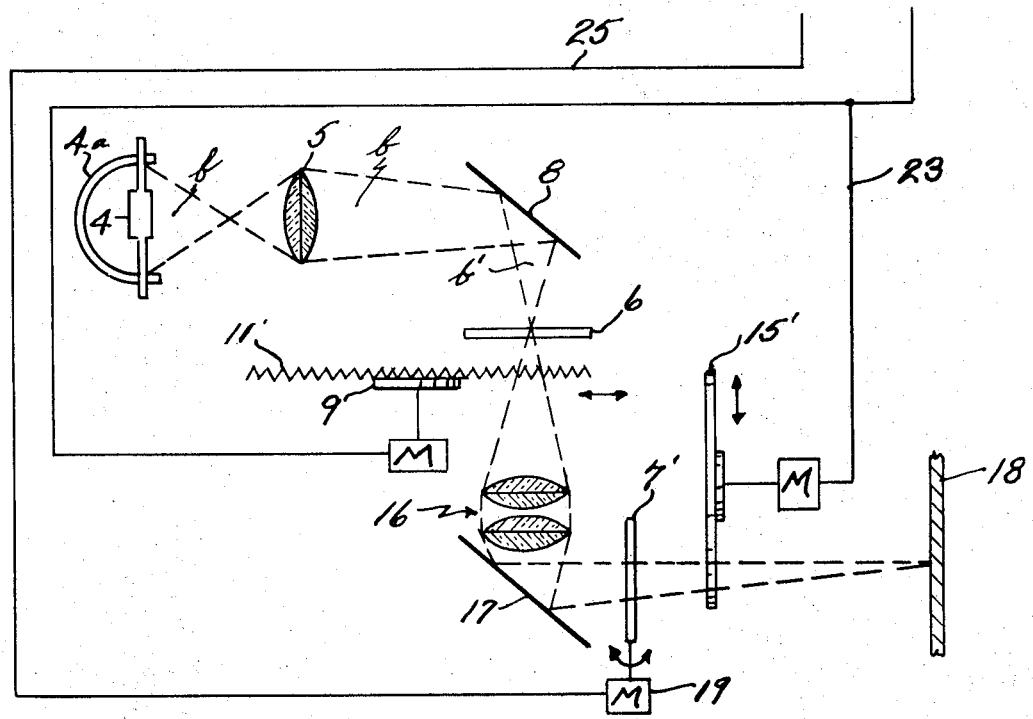

In FIG. 6, the vane element 7' corresponding to the vane element 7' of the FIG. 5 embodiment is moved in the system so as to be disposed on the output side of mirror 17. Also, the analyzer 15' is located in the same relative position as shown therefore in the FIG. 4 structure.

The birefringent element 11 is preferably formed in the manner disclosed in U.S. Pat. to Burchell No. 2,393,968 whereby to cause the illusion of motion within the projected imagery on screen 18.

Figure 7:
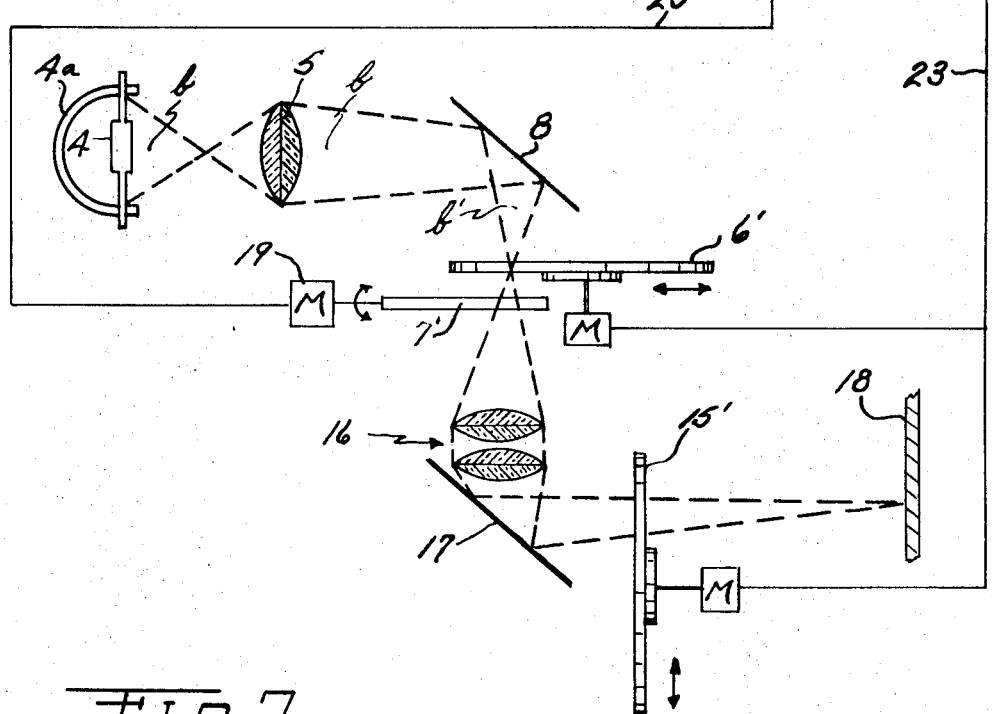

In FIG. 7 the polarizer and analyzer elements 6' and 15' are respectively located at the input and output of the visual interpretation system and the vane element 7' is disposed between the polarizer and the lens system 16.

The polarizer and analyzer elements 6' and 15' may also be responsive to the signal output of either or both counter device 20 or amplifier 21.

Having thus described several preferred embodiments of visual interpretation apparatus it will be understood that it is susceptible to various modifications, combinations and arrangements of apparatus without departing from the inventive concepts thereof as defined in the claims.

I claim:

1. In apparatus for visually interpreting electric signal currents comprising a source of electric signal currents having a plurality of frequencies and amplitudes, means for deriving control signals representative of said audio signal currents, a light source, a polarizer element in light intercepting position with respect to said light source effective to polarize light emanating therefrom, birefringent means positioned to intercept the light emanating from said polarizer element effective to provide retardation thereof, means actuatable by and responsive to at least one of said control signals to proportionately, and in an oscillatory fashion, tiltably swing at least one of said birefringent means between 0 and 90° on an axis substantially parallel with respect to said polarizer element said axis being located so that said tilting of the birefringent means results in a proportional variation in the thickness of said birefringent means traversed by the light from said polarizer element and effect a consequent change in its retardation response, an analyzer element positioned to receive light emanating from said birefringent means, and means in light intercepting position with respect to the light emerging from said analyzer element for projecting said polarized light onto a surface for viewing.

2. In apparatus as defined in claim 1 and wherein the birefringent means comprises at least two birefringent elements positioned to intercept the light emanating from the polarizer element.

3. In apparatus as defined in claim 1 and wherein the birefringent means comprises at least two birefringent elements positioned to intercept the light emanating from the polarizer element, and means actuatable by and responsive to at least one of the control signals to proportionately and in an oscillating fashion swing said birefringent elements.

4. In apparatus for visually interpreting electric signal currents comprising a source of signal currents having a plurality of frequencies and amplitudes, means for deriving control signals representative of said audio signal currents, a light source, a polarizer element in light intercepting position with respect to said light source effective to polarize light emanating therefrom, said polarizer element being characterized by having at least a portion of its total area consisting of designs formed of oriented polarizing materials, said oriented areas being so constructed as to present the illusion of motion, birefringent means positioned to intercept the light emanating from said polarizer element effective to provide retardation thereof, means actuatable by and responsive to at least one of said control signals to proportionately, and in an oscillatory fashion, tiltably swing said birefringent means between 0 and 90° on an axis substantially parallel with respect to said polarizer element, said axis being located so that said tilting of the birefringent means results in a proportional variation in the thickness of said birefringent means transversed by the light from said polarizer element and effect a consequent change in its retardation response, an analyzer element positioned to receive light emanating from said birefringent means, said analyzer element being movably actuated so as to react with the light from the design elements of the polarizer element to create the illusion of motion, and means in light intercepting position with respect to the light emerging from said analyzer element for projecting said polarized light onto a surface for viewing.

5. In apparatus as defined in claim 4 and wherein the analyzer element is positioned to receive light emanating from said birefringent means and is actuatable by and responsive to the control signals to proportionately vary the position of the polarizing axis of said analyzer element so as to react with the light from the design elements of the polarizer to create the illusion of motion.

6. In apparatus for visually interpreting electric signal currents comprising a source of signal currents having a plurality of frequencies and amplitudes, means for deriving control signals representative of said audio signal currents, a light source, a polarizer element in light intercepting position with respect to said light source effective to polarize light emanating therefrom, said polarizer element being actuatable by and responsive to at least one of said control signals to proportionately alter its position and effect a consequent change in its polarizing response, said polarizer element being characterized by having at least a portion of its total area consisting of designs formed of oriented polarizing materials, said oriented areas being so constructed so as to present the illusion of motion, birefringent means positioned to intercept the light emanating from said polarizer element effective to provide retardation thereof, means actuatable by and responsive to at least one of said control signals to proportionately, and in an oscillatory fashion, tiltably swing said birefringent means between 0 and 90° on an axis substantially parallel with respect to said polarizer element said axis being located so that said tilting of the birefringent means results in a proportional variation in the thickness of said birefringent means traversed by the light from said polarizer element to effect a consequent change in its retardation response, an analyzer element positioned to receive light emanating from said birefringent means, said analyzer element being movably actuated so as to react with the light from the design elements of the polarizer element to create the illusion of motion, and means in light intercepting position with respect to the light emerging from said analyzer element for projecting said polarized light onto a surface for viewing.

7. In apparatus as defined in claim 6 and wherein the analyzer element is positioned to receive light emanating from said birefringent means and is actuatable by and responsive to the control signals to proportionately vary the position of the polarizing axis of said analyzer element so as to react with the light from the design elements of the polarizer to create the illusion of motion.

8. In apparatus for visually interpreting electric signal currents comprising a source of signal currents having a plurality of frequencies and amplitudes, means for deriving control signals representative of said audio signal currents, a light source, a polarizer element in light intercepting position with respect to said light source effective to polarize light emanating therefrom, at least two birefringent means positioned to intercept the light emanating from said polarizer element effective to provide retardation thereof, means actuatable by and responsive to at least one of said control signals to proportionately, and in an oscillatory fashion, tiltably swing one of said birefringent means between 0 and 90° on an axis substantially parallel with respect to said polarizer element, said axis being located so that said tilting of the birefringent means results in a proportional variation in the thickness of said birefringent means traversed by the light from said polarizer element and effect a consequent change in its retardation response, means actuatable by and responsive to at least one of said control signals to proportionately alter the position of a second birefringent means and effect a consequent change in its retardation response to said polarized light, said second birefringent means being characterized by having at least a portion of its total area consisting of designs formed of oriented birefringent materials, said oriented areas being so constructed as to present the illusion of motion when viewed through an appropriately moved analyzer element, an analyzer element positioned to receive light emanating from said birefringent means, said analyzer element being movably actuated so as to react with light from the birefringent design elements to create the illusion of motion, and means in a light intercepting position with respect to the light emerging from said analyzer element for projecting said polarized light onto a surface for viewing.

9. In apparatus as defined in claim 8 and wherein means actuatable by and responsive to the control signals proportionately vary the position of the polarizing axis of said analyzer element so as to react with the light from the birefringent design elements to create the illusion of motion.

10. In apparatus for visually interpreting the electric signal currents comprising a source of signal currents having a plurality of frequencies and amplitudes, means for deriving control signals representative of said audio signal currents, a light source, a polarizing element in light intercepting position with respect to said light source effective to polarize light emanating therefrom, at least three birefringent means positioned to intercept the light emanating from said polarizer element effective to provide retardation thereof, an analyzer element positioned to receive light emanating from said birefringent means, means actuatable by and responsive to at least one of said control signals to proportionately, and in an oscillatory fashion, tiltably swing one of said birefringent means between 0 and 90° on an axis substantially parallel with respect to said polarizer element, said axis being located so that said tilting of the birefringent means results in a proportional variation in the thickness of said birefringent means traversed by the light from said polarizer element and effect a consequent change in its retardation response, means actuatable by and responsive to at least one of said control signals to proportionately alter the position of a second birefringent means and effect a consequent change in its retardation response to said polarized light, said birefringent means being characterized by having at least a portion of its total area consisting of designs formed of oriented birefringent materials, said oriented areas being so constructed as to present the illusion of motion, said third birefringent means being movably actuated so as to react with light from the birefringent design elements to create the illusion of motion when viewed through said analyzer element, and means in light intercepting position with respect to the light emerging from said analyzer element for projecting said polarized light onto a surface for viewing.